United States Patent
Telleen

[19]

[11] Patent Number: 6,079,366
[45] Date of Patent: Jun. 27, 2000

[54] REMOVABLE DAIRY FREE STALL BASE

[76] Inventor: Bruce A. Telleen, 23307 Hwy. 151, Monticello, Iowa 52310

[21] Appl. No.: 09/167,626

[22] Filed: Oct. 6, 1998

[51] Int. Cl.[7] .................................................. A01L 1/015
[52] U.S. Cl. ........................ 119/525; 119/526; 119/529; 119/530
[58] Field of Search ..................................... 119/520, 525, 119/526, 529, 530, 28.5; 52/581

[56] References Cited

U.S. PATENT DOCUMENTS

| | | | |
|---|---|---|---|
| 91,949 | 6/1869 | Mahony . | |
| 360,452 | 4/1887 | Lansing . | |
| 377,786 | 2/1888 | Stowe . | |
| 3,721,215 | 3/1973 | Vickstrom et al. | 119/529 |
| 3,722,474 | 3/1973 | Vickstrom | 119/529 |
| 4,018,188 | 4/1977 | Burdette | 119/529 |
| 5,351,458 | 10/1994 | Lehe | 52/586.2 |
| 5,653,195 | 8/1997 | Young | 119/526 |

*Primary Examiner*—Peter M. Poon
*Assistant Examiner*—Yvonne Abbott
*Attorney, Agent, or Firm*—Joseph W. Holland

[57] ABSTRACT

A mat for a free stall, the mat having a series of body supports and a series of connectors or spacers. The body support members are in a spaced apart relationship that defines a series of compartments. The connectors or spacers interconnect the body supports. The mat may optionally include a series of connecting strands, that threadably pass through at least one body support and one connector. In one described embodiment the body supports are a series of elongated strips of recycled tire carcasses in an approximately parallel and spaced apart relationship to each other. Each body support is spaced apart from the next body support by connectors. The described embodiment has a connector positioned near each end of elongated body support and at least one additional connector positioned approximately midway between the two connectors located near the ends of body support. The mat may optionally include a built in "brisket board," in the form of a taller body support located along one edge of the mat, with the brisket board intended to be positioned in the free stall in an orientation that results in the cow's head being in the nearest proximity to brisket board.

7 Claims, 5 Drawing Sheets

REMOVABLE DAIRY FREE STALL BASE

FIELD OF THE INVENTION

Embodiments of the present invention relate to animal mats and dairy free stall bases, which are intended to be operatively disposed on the ground or floor for use in a free stall.

BACKGROUND

Dairy cattle are typically managed to maximize milk production. One component of this is to maximize cow comfort, in their housing, in a cost effective manner. To improve and manage cow comfort dairy cows are typically housed in free stall barns.

An excellent review of some typical aspects of free stall management decisions and materials can be found in publication number EBAE 176-93, published by North Carolina Cooperative Extension Service, by James C. Barker, entitled *Used Tires in Dairy Free Stall Bases.* Much of the information contained in that publication is reproduced in the background information contained herein.

Original stalls had soil bases contained by a concrete curb and covered with sawdust, wood shavings, straw or other moisture-absorbent material. As cows shifted position on these surfaces, holes were dug and wallowed out, which if not filled could cause injury or become a collector for waste materials and moisture. The potential for mastitis and other diseases increases when cows use these imperfect stall bases. Obviously, considerable maintenance is required to keep the stalls in suitable condition.

Other stall surface materials such as concrete, concrete with rubber mats or outdoor carpet, or clay bases covered with mats or sand which could be easily smoothed have been tried to overcome the disadvantages of soil bases. Usually these hard surfaces were covered with a thin layer of wood shavings or lime to provide cushioning for the cow and to absorb moisture. Each of these base materials have their advantages from a management standpoint, but have disadvantages regarding cow comfort. Cows seem to prefer softer surfaces making some of the harder bases less desirable. The mats must be extremely tough and durable to keep from being rendered unusable. Sand and lime provide problems with manure handling systems, particularly liquid manure equipment. Competition for sawdust or wood shavings has rendered these materials expensive or hard to obtain.

In looking about the farmstead and surrounding community, one can observe that there are a number of materials discarded because they no longer serve the purpose for which they were originally intended, or are now viewed as waste materials. It is advantageous to find uses for some of these materials through recycling rather than continue to allow them to litter the landscape or take up valuable space in landfills. One such material is used automobile tire carcasses. Some communities stockpile old tires near landfill sites. Other sources are automobile service stations, tire service centers and farmsteads. Usually, these tires are available for the asking or are very inexpensive. Whole used tires can be used as a dairy free stall base material to stabilize the soil while providing a soft cushioned surface.

In fact, tires have been used for a number of years in dairy free stalls at the Piedmont Research Station near Salisbury, N.C. and more recently in a number of other states. Cows have accepted the tires very well and seem to prefer the soil-embedded tires in stalls to alternative surfaces. The digging of holes in stall surfaces has been virtually eliminated.

The tires are typically embedded firmly in the soil. A disadvantage of using whole tire carcasses is that if the soil is not packed in and around the tires, cows can move them out of place. Tires for a 13- or 14-inch diameter wheel work best in a 48-inch wide stall. Larger diameter or wider tires may be used but require more soil depth and packing. They should be placed side-by-side and touching. Six tires are required for each stall.

If fine-textured soil is thoroughly packed inside and around the tires, there does not seem to be a need to cut or drill holes in the bottom sidewall since moisture and urine do not seep through the soil and accumulate in the tire. Some producers initially fasten the tires together with lag bolts to help anchor them although this also seems unnecessary if they are installed properly. Tires toward the front of the stall should be slightly higher with a 4- to 6-inch slope from front to rear. Tires at the rear of the stalls should be about even with the top of the curbing.

Use of a sand layer underneath the tires facilitates positioning of them relative to the stall surface and helps drain moisture away from the stall base. Soils containing some silt or clay or other fine-textured materials work best for packing in and around the tires. Care must be taken to pack soil inside the tire carcass as well as around it. Wooden spreader blocks are helpful for opening up the carcass to get soil inside the tire. Soil should be filled and packed to the top of the tire tread.

A thin layer of bedding material such as wood shavings, composted manure solids, or lime is usually spread over the stall floor surface. A minimum of maintenance weekly typically keep these surfaces dry and comfortable for the cow.

A significant disadvantage to using whole tire carcasses as free stall bases is the work required to position and anchor them properly. It is generally considered to be impractical, and therefore unuseable, to employ whole tires in free stall bases and still achieve other typical management goals. A 100-stall barn requires the bases of each stall to be excavated and prepared to receive the tires. Six tires in each stall (a total of 600 tires) requires the addition and packing of soil by hand labor. The durability of tires in free stalls seems to be about 5 years if they are heavily used. The cows, however, seem to prefer tire-surfaced stalls and appear to be comfortable. Bedding costs and maintenance can be significantly reduced. Cow cleanliness is much improved and the potential for udder diseases reduced because the cows are more likely to use the clean, dry stalls. The incidence of bruised hocks and leg abrasions is reduced when compared to harder more abrasive stall surfaces.

In summary, the use of whole automobile tire carcasses in dairy free stall bases is yet another example of a management choice that dairymen can make that also contributes to their communities by recycling a product otherwise considered a waste material into an inexpensive and functional part of their production facilities.

There still remains a need for means to improve dairy cow comfort, particularly as it relates to cows' use of free stalls.

SUMMARY

The present invention comprises a mat for a free stall, the mat having a plurality of body supports and a plurality of connectors or spacers. The body support members are in a spaced apart relationship that defines a series of compartments. The connectors or spacers interconnect the body supports. The mat may optionally include a series of connecting strands, that threadably pass through at least one body support and one connector. By threadably it is meant that the strands pass through the interior of the connector in a manner that is analogous to the way an item would be threaded onto a string or rope. In one described embodiment the body supports are a series of elongated strips of recycled tire carcasses in an approximately parallel and spaced apart relationship to each other.

In other embodiments, the mat and body support members may be of any suitable material, that will support the weight of the animal, typically a dairy cow, that is intended to use the mat. In other embodiments the body support members may be in a relationship other than the parallel, spaced apart relationship. Additionally, in any embodiment, the spacers or bridging connectors members may be of separate construction or may be manufactured integrally with body support members.

In the embodiment employing elongated strips of tire carcasses, each body support is spaced apart from the next body support by the connectors. The described embodiment has a connector positioned near each end of elongated body support and at least one additional connector positioned approximately midway between the two connectors located near the ends of body support. The mat may optionally include a built in "brisket board," in the form of a taller body support located along one edge of the mat, with the brisket board intended to be positioned in the free stall in an orientation that results in the cow's head being in the nearest proximity to brisket board.

Examples of alternative configurations or spaced apart relationships for the body support members include, but are not limited to, a series or network of spaces or compartments, defined by the walls of the body support members. In any embodiment the connecting strands may optionally be included as an additional or alternative device for functionally interconnecting the body support members and the connectors.

In some configurations or designs of the mat any connector may be in contact with two or more body support members. When a connector is in contact with two or more body support members, it may be desirable to have a plurality of the connecting strands passing through the connector and the adjacent body support members. The connecting strands may be of any suitable material.

Additional advantages and novel features of the invention will be set forth in part in the description that follows, and in part will become apparent to those skilled in the art upon examination of the following or may be learned by practice of the invention. The advantages of the invention may be realized and attained by means of the instrumentalities and combinations particularly pointed out in the appended claims.

DETAILED DESCRIPTION OF THE INVENTION

Referring now to the figures, exemplary embodiments of free stall base or mat 10 are described herein.

Figure 1:
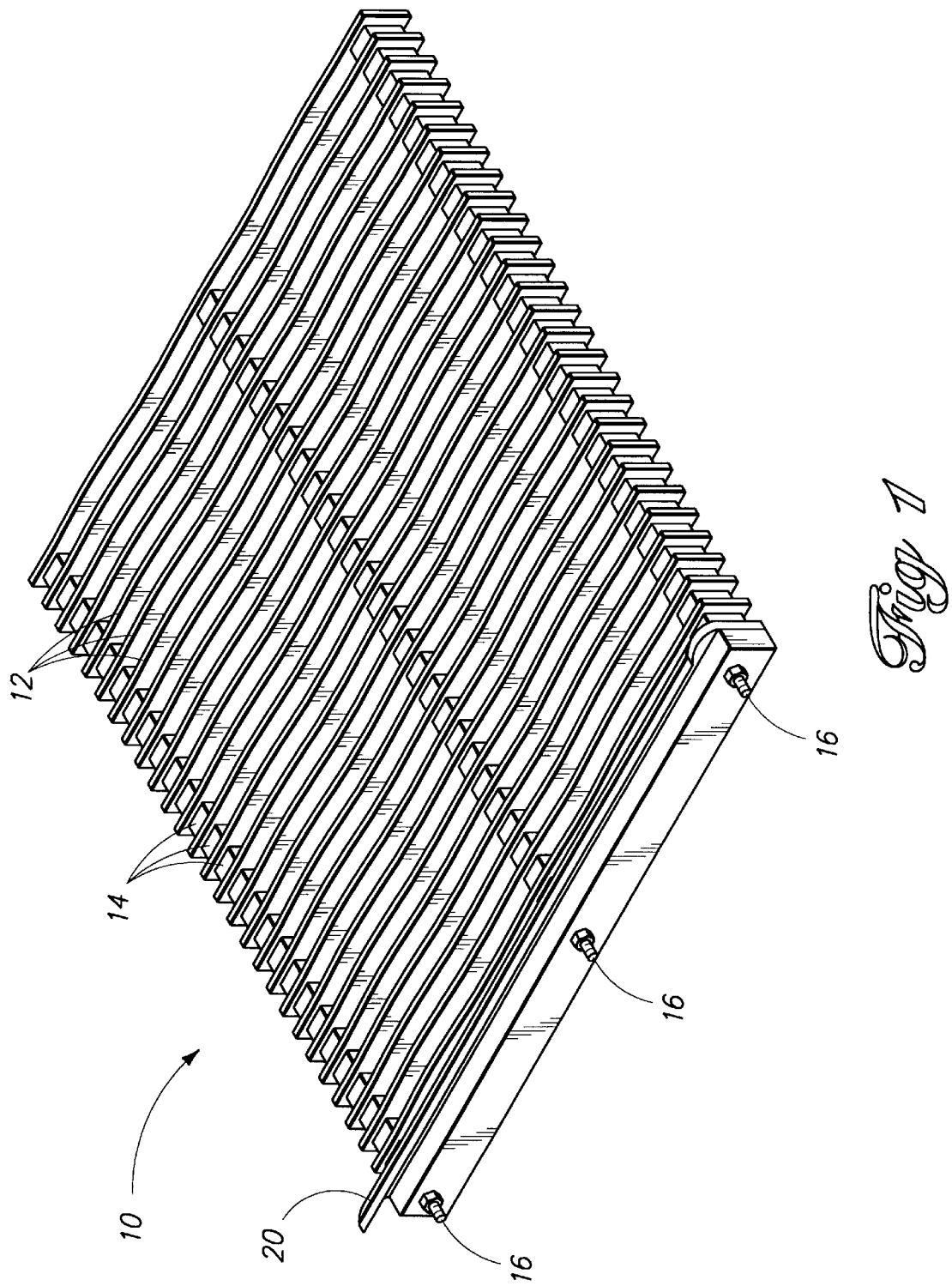
FIG. 1 shows an embodiment of the present invention wherein the body support members are made from elongated strips of recycled tire carcasses and includes the optional brisket support.

FIG. 1 shows an exemplary embodiment of mat 10 constructed out of a plurality of deformable body support members 12 and spacers or bridging connectors 14. The body support members 12 may be directly bridged or connected to each other by connectors 14 or optionally connecting strands 16 may pass, in a threaded manner, through both body supports 12 and connectors 14.

In the embodiment shown in FIG. 1 body support members 12 are comprised of a series of inline and elongated strips of recycled tire carcasses in an approximately parallel and spaced apart relationship to each other. In the embodiment shown in FIG. 1, each support member 12 is composed of an elongated strip portion of a tire carcass. Each body support member has a length, width and height; here the height of each body support member 12 is greater than its width, and in accordance with the plain meanings of the words, the length is greater than the width for each body support member 12. Here each body support member 12 is spaced apart from the next body support member 12 by a plurality of connectors 14. The exemplary embodiment shown in FIG. 1 has a connector 14 positioned near each end of elongated body support member 12 and at least one additional connector 14 positioned approximately midway between the two connectors 14 located near the ends of body support member 12.

Connectors 14 may be positioned anywhere along the elongate dimension of body support member 12 to furnish the structure necessary to support the spaced apart relationship between body support members 12. Here there are 3 connectors 14 connecting and spacing apart each body support member 12, with a connector 14 being positioned near each end of body support member 12 and a third connector positioned approximately in the middle of each support member 12. This pattern of positions for connectors 14 is simple and functional. If desired, however connectors 14 may be positioned relative to each other in patterns that create a pleasing or desired design as an alternative. Connectors or spacers 14, shown in FIG. 1 are manufactured out of plastic, however spacers 14 may be made out of any material that will both connect body support members 12 and space apart body support members, as needed. Suitable material for the manufacture of connectors or spacers 14, includes, but is not limited to metal, wood, rubber, and composite materials. Particularly in the embodiment shown in FIG. 1, connectors or spacers 14 are desirably dimensioned so that the length of each connector 14 is greater than the width of body support members 12.

In other embodiments, mat 10 and body support members 12 may be of any suitable material, that will support the weight of the animal, typically a dairy cow, that is intended to use mat 10. For example mat 10 and body supports 12 may be made out of wood, plastic, rubber, or composite materials. Preferably body support members 12 are of a material that is comparatively sturdy and slightly deformable. A deformable character material will make mat 10 more comfortable for the animal, when mat 10 is in use. Mat 10, however, may be made from a non-deformable material and still be adequate for the intended use of mat 10. For example, if mat 10 is made from a relatively rigid or non-deformable material, such as wood, mat 10 may optionally be combined with a relatively resilient or springy bedding material on top of mat 10 in the free stall to produce a similar effective level of comfort for the animal as if mat 10 were made from a relatively more deformable material.

Figure 4:
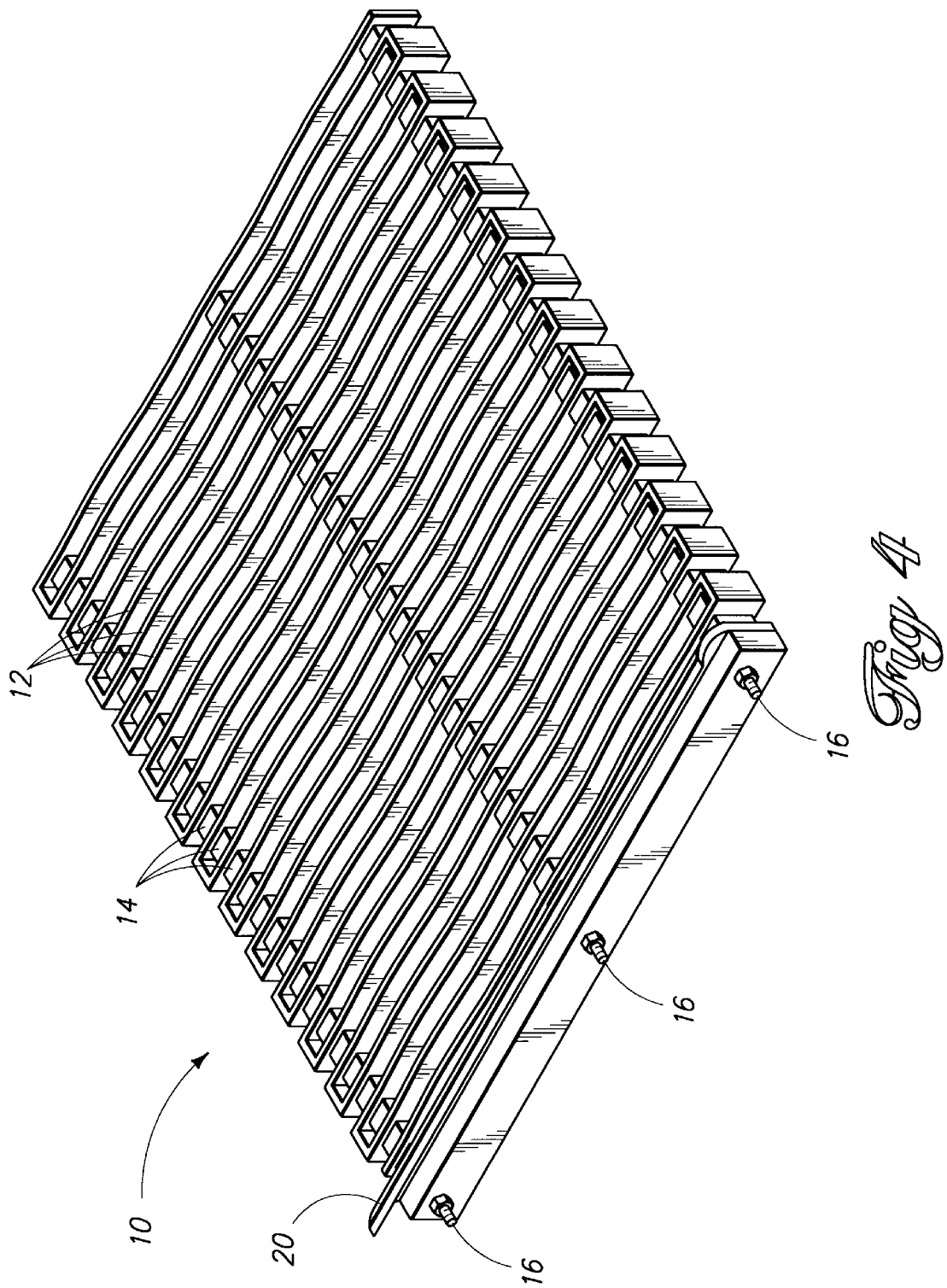
FIG. 4 shows an alternative embodiment wherein the body support members are made out of one continuous strip.

In other embodiments body support members 12 may be in a relationship other than the parallel, spaced apart relationship shown in FIG. 1 and described above. In any embodiment it is desirable that the height of each body support member is greater than its width. It is desirable that body support members 12 be spaced apart and in a relationship that is able to support the weight of the animal intended to use mat 10. It is also desirable that body support members 12 be spaced apart in a manner and relationship to each other that is effective to hold bedding material in the spaces or compartments 18 that are formed and defined by body support members 12 and spacers or bridging connectors 14. Another exemplary relationship for body support members 12 and spacers 14 is shown in FIG. 4, wherein a tire carcass is formed into one continuous strip and the plurality of body support members 12 are made from a single strip and interconnected by spacers 14. The spacing of body support members 12 desirably should also permit drainage through mat 10 to the extent desired and allowable, depending on the nature of the bedding material used.

Figure 2:
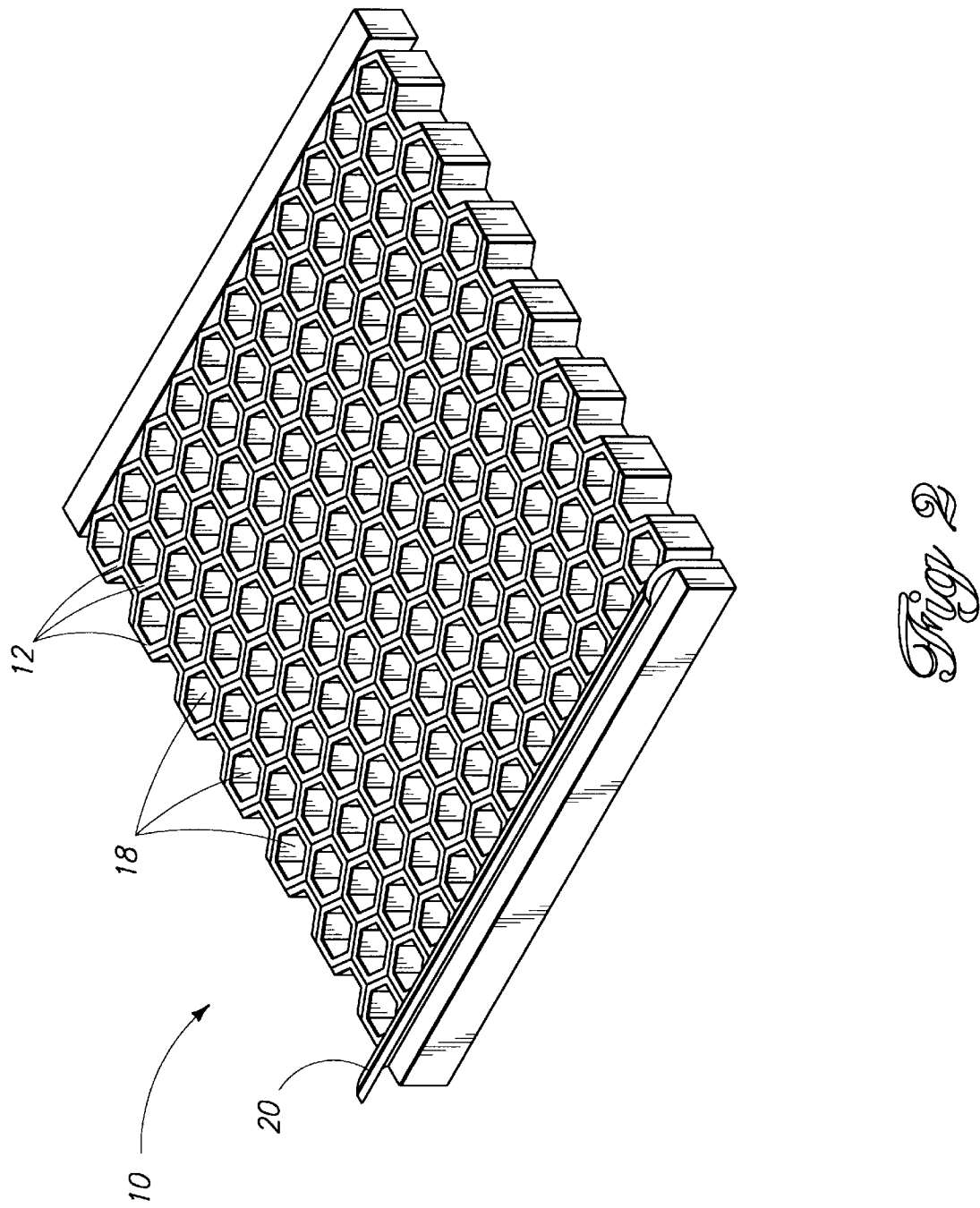
FIG. 2 shows an alternative embodiment of the invention, and includes the optional brisket support.

Examples of alternative configurations or spaced apart relationships for body support members 12 include, but are not limited to, a series or network of spaces or compartments 18, defined by the walls of body support members 12. Compartments 18 can be of a variety of shapes and may all be of the same shape or a plurality of shapes throughout mat 10. Examples of shapes for compartments 18 include, but are not limited to, honeycomb or octagonal, diamond shaped, circular, triangular, wave shaped, any other rhomboidal or trapezoidal shape, or specific ornamental shape, etc. The particular shape and spaced apart relationship adopted for body support members 12 should be suitable to accomplish the purposes of supporting an animal using mat 10 and bedding material disposed in the spaces or compartments 18 that are defined by the surrounding body support members 12. Another exemplary embodiment with alternative spaced apart relationship for body support members 12 is shown in FIG. 2.

Figure 3:
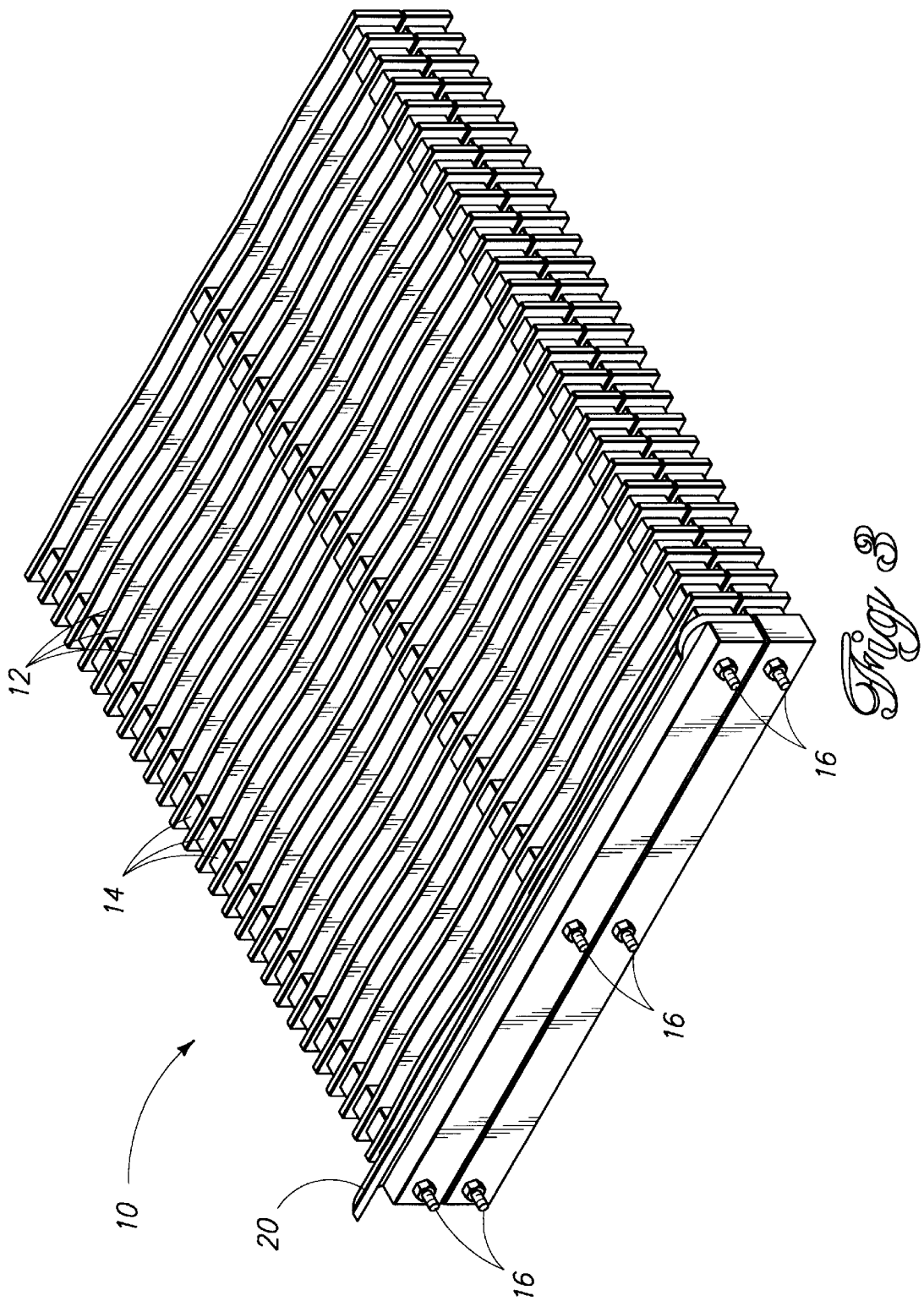
FIG. 3 shows another embodiment wherein more than one mat of the present invention is used in a free stall.

Additionally, in any embodiment, spacers or bridging connectors members 14 may be of separate construction or may be manufactured integrally with body support members 12. For example, body support members 12 and connectors 14 may be of unitary construction through the use of forms and/or molding technology in the manufacture of mat 10. An example of an embodiment wherein body support members 12 and connectors 14 are of unitary construction is shown in FIG. 2. It is desirable that body support members 12 be of sufficient dimensions for a single mat 10 to adequately support an animal, when mat 10 is in use, however mat 10 may be constructed in such a manner that under some environmental and/or management conditions it is desired to use more than one mat 10, that is to say to stack a plurality of mats 10 on top of each other as shown in FIG. 3.

In any embodiment connecting strands 16 may optionally be included as an additional or alternative device for functionally interconnecting body support members 12 and connectors 14. In embodiments where connecting strands 16 are included at least one strand 16 passes through both a connector 14 and at least one body support member 12. Connecting strand 16 functions to threadably connect or reinforce the connection between bridging member 14 and body support member 12.

In some configurations or designs of mat 10 any connector 14 may be in contact with two or more body support members 12, as shown in FIG. 1, where connector 14 is in contact with two connectors 14. When connector 14 is in contact with two or more body support members 12, it may be desirable to have a plurality of connecting strands 16 passing through connector 14 and adjacent body support members 12. Connecting strand 12 may be of any suitable material including, but not limited to, wire, wire cable, threaded rod, nylon rope or cable, fiber rope, other polymer rope or cable, and the like.

Figure 5:
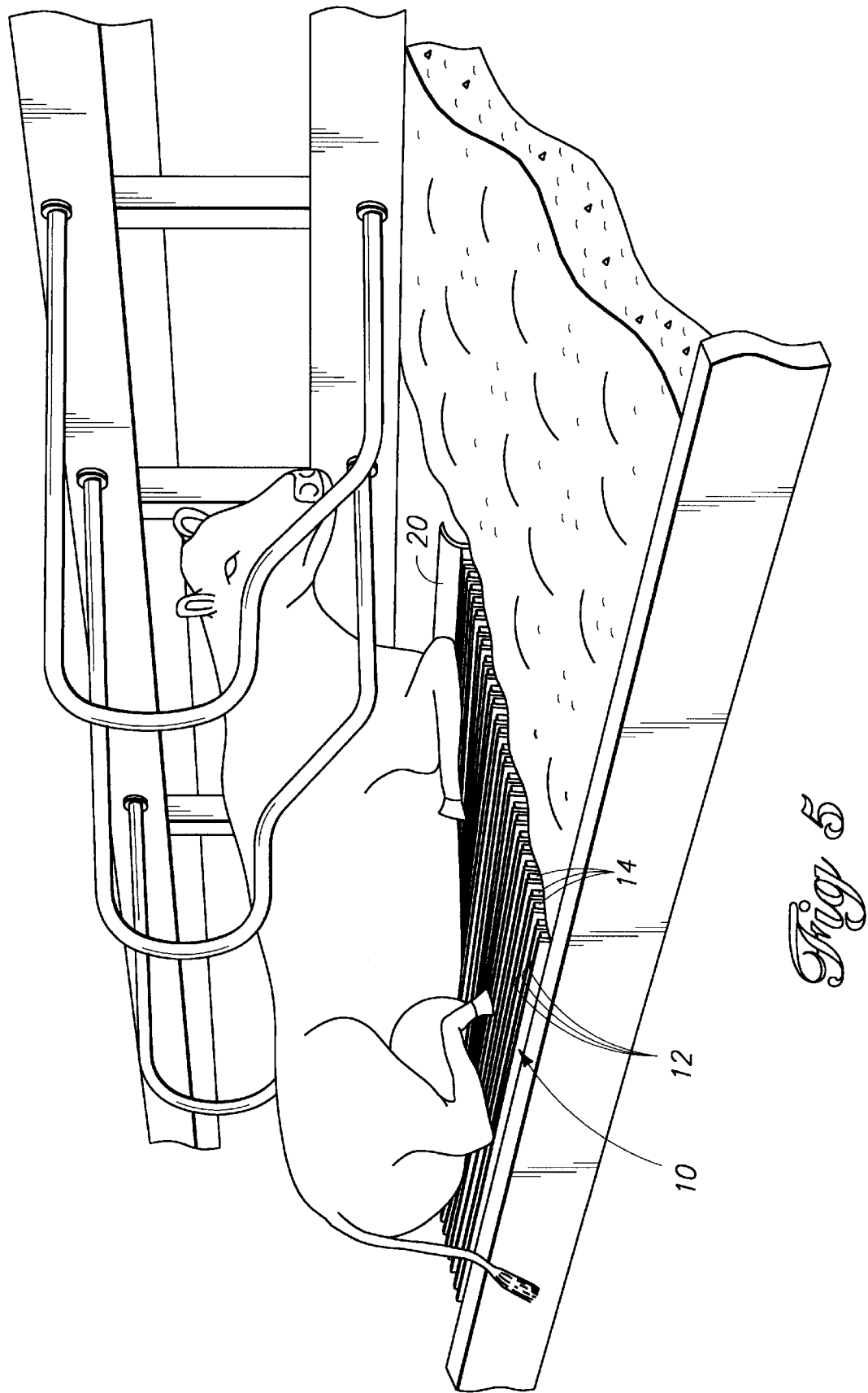
FIG. 5 shows the present invention in use.

FIG. 5 shows mat 10 in use and body support members 12 oriented approximately perpendicular to the head-to-tail axis of the cow. The perimeter dimensions of mat 10 can be rectangular or square or adjusted to be shaped to fit any particular free stall set up. Furthermore, any 2 sides of mat 10 may be the sides, with reference to the orientation of an animal using mat 10 and likewise, any two sides of mat 10 may be designated as the front or back of mat 10, with reference to the orientation of an animal using the mat.

Mat 10 may optionally include a built in "brisket board" or brisket support 20, in the form of a taller body support member 10 located along one edge of mat 10 wherein the edge with the taller body support member 12 or brisket board 20 is intended to be positioned in the free stall in an orientation that results in the cow's head would be in the nearest proximity to brisket board 20. Optional brisket board 20 provides a convenient means for providing a brisket board in the free stall. A brisket board greatly facilitates the animal's ability to get up from the lying down position in the free stall and therefore is one way of encouraging use of the free stall by the animal, which is desirable.

In use, mat 10 is placed on the ground or floor of an empty free stall. The free stall typically is in the range of 44 to 48 inches wide and in the range of 7.5 to 8 feet long. It is desirable that the outside dimensions of mat 10 be sufficient within the free stall to provide adequate support for a cow or intended animal, when the free stall is occupied.

After mat 10 is placed in a free stall, compartments 18 are desirably filled with a bedding material, with sand being the most desirable bedding material. Other bedding materials may be used instead of sand, for example, clay or other suitable granular or porous materials. The sand or other bedding material is desirably packed tightly in compartments 18 of mat 10.

Typically approximately 3 to 4 inches of a softer bedding, such as shavings, straw or other suitable bedding with similar characteristics is provided on top of the sand bedding. Ideally the total height of the free stall, including bedding, that is ready for use is approximately 10 inches. The bedded free stall with mat 10 placed or installed, as described above, is ready for use or occupation by a cow.

The present invention provides a device to improve cow comfort in the use of a dairy free stall. The present invention permits an improved and more effective way of using sand as a base bedding in free stalls. The free stall base of the instant invention permits better draining from the free stall, improved containment and use of bedding material and improved economics in dairy management, through such means as improved cow comfort and lower physical facility costs.

Whereas particular embodiments of the invention have been described hereinabove, for purposes of illustration, it will be evident to those skilled in the art that numerous variations of the details may be made without departing from the invention as defined in the appended claims.

The present invention is not limited to the descriptions of specific embodiments presented hereinabove, but rather the present invention should be viewed in terms of the claims that follow and equivalents thereof. Further, while the invention has been described in conjunction with several specific embodiments, it is to be understood that many alternatives, modifications, and variations will be apparent to those skilled in the art in light of the foregoing detailed descriptions. Accordingly, this invention is intended to embrace all such alternatives, modifications, and variations which fall within the spirit and scope of the appended claims.

What is claimed is:

1. A mat for a cow free stall, the mat comprising:

a plurality of deformable body support members;

a plurality of generally rigid spacers;

wherein the body support members are in a parallel spaced apart relationship to each other, the body support members being spaced apart by the rigid spacers positioned in a linear relationship between each support; and a brisket board positioned and affixed along a side of the mat.

2. The mat of claim 1 further comprising:

a plurality of connecting strands wherein the connecting strands pass through the body supports and spacers; and the spacers are positioned at least at each end of the supports.

3. The mat of claim 1 wherein the body support members have a length, height and width and the height is substantially greater than the width.

4. The mat of claim 3 wherein the spacers have a length and the spacer length is greater than the width of a body support member.

5. A mat for a cow free stall, the mat comprising:

a plurality of deformable body supports each separated from any other body support by at least two generally rigid spacers;

at least two connecting members extending through the spacers and the body supports to form a mat having the plurality of body members arranged in spaced apart relation one to the other; and a brisket board positioned and affixed along a side of the mat.

6. The mat of claim 5 wherein the body support members have a length, height and width and the height is substantially greater than the width.

7. The mat of claim 6 wherein the spacers have a length and the spacer length is greater than the width of a body support member.

* * * * *